United States Patent
Xie

(10) Patent No.: US 8,713,858 B1
(45) Date of Patent: May 6, 2014

(54) ROOF ATTACHMENT FLASHING SYSTEM

(71) Applicant: Jason Sen Xie, Fremont, CA (US)

(72) Inventor: Jason Sen Xie, Fremont, CA (US)

(73) Assignee: Jason Sen Xie, Fremont, CA (US)

( * ) Notice: Subject to any disclaimer, the term of this patent is extended or adjusted under 35 U.S.C. 154(b) by 0 days.

(21) Appl. No.: 13/714,805

(22) Filed: Dec. 14, 2012

Related U.S. Application Data

(60) Provisional application No. 61/579,644, filed on Dec. 22, 2011.

(51) Int. Cl.
| | | |
|---|---|---|
| *E04D 1/36* | (2006.01) | |
| *E04D 13/147* | (2006.01) | |
| *E04B 1/64* | (2006.01) | |
| *E04B 1/66* | (2006.01) | |

(52) U.S. Cl.
CPC ............... *E04D 13/1478* (2013.01); *E04B 1/64* (2013.01); *E04B 1/66* (2013.01)
USPC .................................................. 52/58; 52/60

(58) Field of Classification Search
USPC .................. 52/58, 60, 24, 25, 26, 173.3, 219; 248/237
See application file for complete search history.

(56) References Cited

U.S. PATENT DOCUMENTS

| | | | | |
|---|---|---|---|---|
| 285,164 | A * | 9/1883 | Ryan | 248/237 |
| 1,864,457 | A * | 6/1932 | Nelson | 248/237 |
| 2,172,796 | A * | 9/1939 | Krasin | 52/27 |
| 2,536,386 | A * | 1/1951 | Moore | 248/72 |
| 5,113,971 | A * | 5/1992 | Violet | 182/45 |
| 5,469,671 | A * | 11/1995 | Rathgeber et al. | 52/58 |
| 6,584,737 | B1 * | 7/2003 | Bradley, Jr. | 52/173.3 |
| 7,658,356 | B1 * | 2/2010 | Nehls | 248/300 |
| 7,921,607 | B2 * | 4/2011 | Thompson et al. | 52/60 |
| D655,149 | S * | 3/2012 | Dotsey | D8/354 |
| D656,813 | S * | 4/2012 | Dotsey et al. | D8/354 |
| 8,316,592 | B2 * | 11/2012 | Lanza | 52/173.3 |
| D684,033 | S * | 6/2013 | Preda | D8/354 |
| 8,453,986 | B2 * | 6/2013 | Schnitzer | 248/237 |
| 2006/0156648 | A1 * | 7/2006 | Thompson et al. | 52/173.3 |
| 2008/0302934 | A1 * | 12/2008 | Nelson et al. | 248/237 |
| 2010/0088996 | A1 * | 4/2010 | Thompson et al. | 52/704 |

* cited by examiner

*Primary Examiner* — Basil Katcheves

(57) ABSTRACT

A roof attachment flashing system for preventing water penetration when utilizing an L-foot to attach a structure to a roof. The roof attachment flashing system generally includes a flashing member which is adapted to be utilized to seal penetrations of a roof which are necessitated by the installation of an L-foot for securing a roof attachment such as solar panels to the roof. The flashing member includes a receiver member at its first end which includes a raised portion defining a slot on its lower surface that will sealably cover the horizontal portion of the L-foot. A mounting bracket extends upwardly from the receiver member for securing the flashing member to the vertical portion of the L-foot. When installed, the flashing member will prevent water from leaking into the roof through any penetrations into the roof caused by installation of the L-foot.

17 Claims, 8 Drawing Sheets

US 8,713,858 B1

ROOF ATTACHMENT FLASHING SYSTEM

CROSS REFERENCE TO RELATED APPLICATIONS

I hereby claim benefit under Title 35, United States Code, Section 119(e) of U.S. provisional patent application Ser. No. 61/579,644 filed Dec. 22, 2011. The 61/579,644 application is currently pending. The 61/579,644 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a roof attachment flashing and more specifically it relates to a roof attachment flashing system for preventing water penetration when utilizing an L-foot to attach a structure to a roof.

2. Description of the Related Art

Any discussion of the related art throughout the specification should in no way be considered as an admission that such related art is widely known or forms part of common general knowledge in the field.

Increasingly, roof attachments such as solar photovoltaic or thermal installations are being utilized by homeowners and businesses in an effort to reduce energy costs. Typically, such structures have been secured to a roof using an L-foot attachment known in the art, wherein the horizontal portion of the L-foot is secured to structural elements on the roof and the vertical portion is secured to the structure being attached, such as solar panels or solar water collectors.

The installation of such L-foot attachments generally necessitates penetration of the roof with a screw or other roof fastener in order to secure the L-foot attachment to the roof. In the past, various methods have been utilized to seal such a penetration to prevent water leakage into the roof. Such methods have included utilizing roofing sealant and flashing over the L-foot attachment. However, sealing penetration with roofing sealant may deteriorate over time and/or crack. Utilizing flashing often requires that the flash itself be nailed to the roof, which again creates new roof penetrations and potential water leakage points.

Because of the inherent problems with the related art, there is a need for a new and improved roof attachment flashing system for preventing water penetration when utilizing an L-foot to attach a structure to a roof.

BRIEF SUMMARY OF THE INVENTION

The invention generally relates to a roof attachment flashing system which includes a flashing member which is adapted to be utilized to seal penetrations of a roof which are necessitated by the installation of an L-foot for securing a roof attachment such as solar panels to the roof. The flashing member includes a receiver member at its first end which includes a raised portion defining a slot on its lower surface that will sealably cover the horizontal portion of the L-foot. A mounting bracket extends upwardly from the receiver member for securing the flashing member to the vertical portion of the L-foot attachment.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
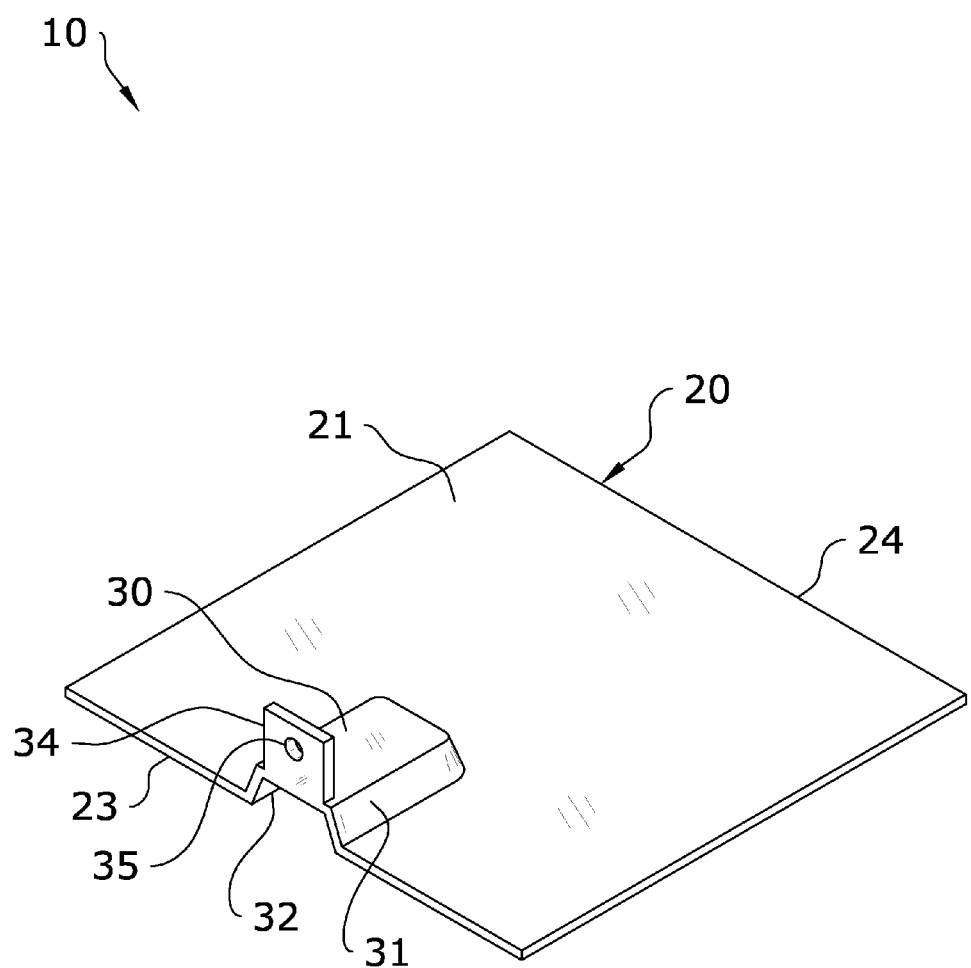
FIG. 1 is an upper perspective view of the present invention.

A. Overview.

Turning now descriptively to the drawings, in which similar reference characters denote similar elements throughout the several views, FIGS. 1 through 9 illustrate a roof attachment flashing system 10, which comprises a flashing member 20 which is adapted to be utilized to seal penetrations of a roof 11 which are necessitated by the installation of an L-foot 12 for securing a roof attachment 15 such as solar panels to the roof 11. The flashing member 20 includes a receiver member 30 at its first end 23 which includes a raised portion 31 defining a slot 32 on its lower surface 22 that will sealably cover the horizontal portion of the L-foot 12. A mounting bracket 34 extends upwardly from the receiver member 30 for securing the flashing member 20 to the vertical portion of the L-foot attachment 12.

B. Flashing.

The present invention generally includes a flashing member 20 which is adapted to aid in securing a roof attachment 15 such as a solar panel to a roof 11 using L-feet 12 without requiring holes or other structural modifications to the roof 11 itself to accommodate the attachment 15. It should be appreciated that the present invention may be utilized to secure any structure utilizing an L-foot 12 or similar attachment device to a roof, including without limitation such structures as solar panels, solar water collectors and the like.

Figure 2:
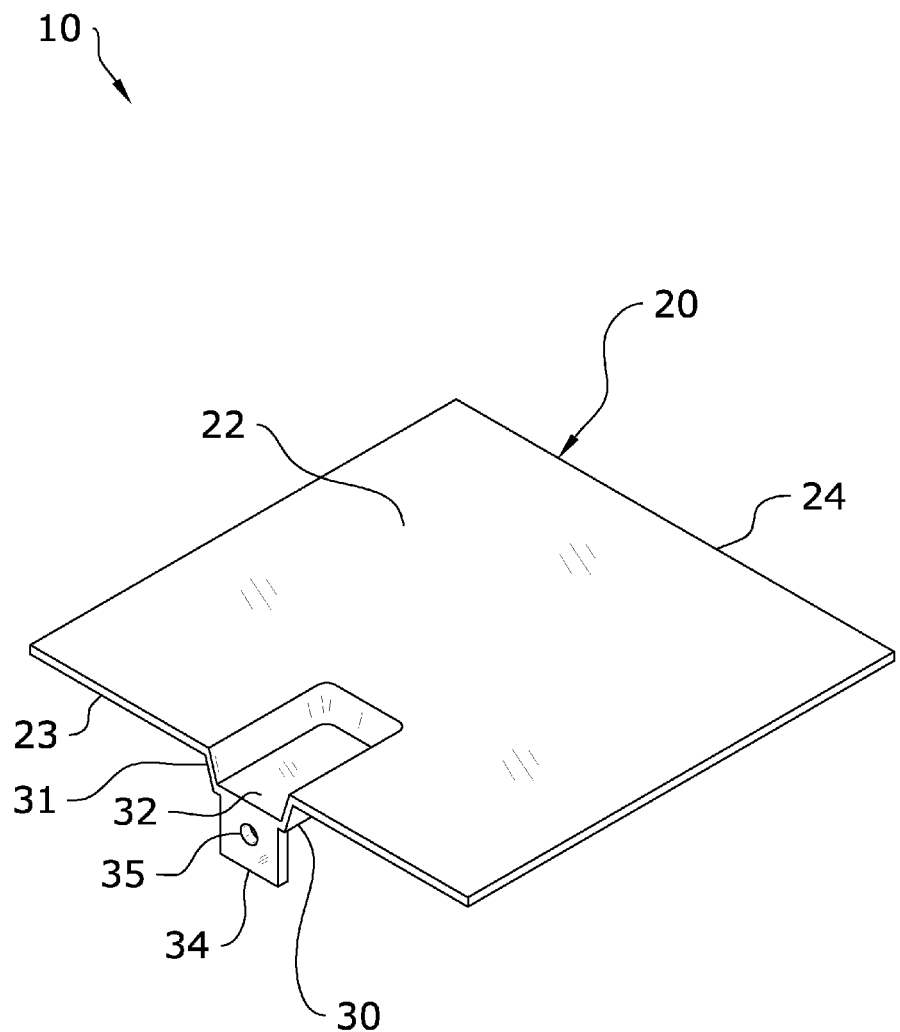
FIG. 2 is a lower perspective view of the present invention.

As shown in FIGS. 1 and 2, the flashing member 20 is generally comprised of a substantially rectangular or square-shape, though various other shapes may be utilized to accommodate different roofs 11. The flashing member 20 may be comprised of various materials which are capable of sustaining repeated contact with water and other weather elements without negatively impacting their structure integrity. By way of example, the flashing member 20 may be comprised of aluminum, extruded aluminum alloy, stainless steel, galvanized metal or other materials.

The flashing member 20 includes an upper surface 21 and a lower surface 22. The lower surface 22 of the present invention will directly contact the roof 11 itself. The flashing member 20 also includes a first end 23 and a second end 24.

Figure 3:
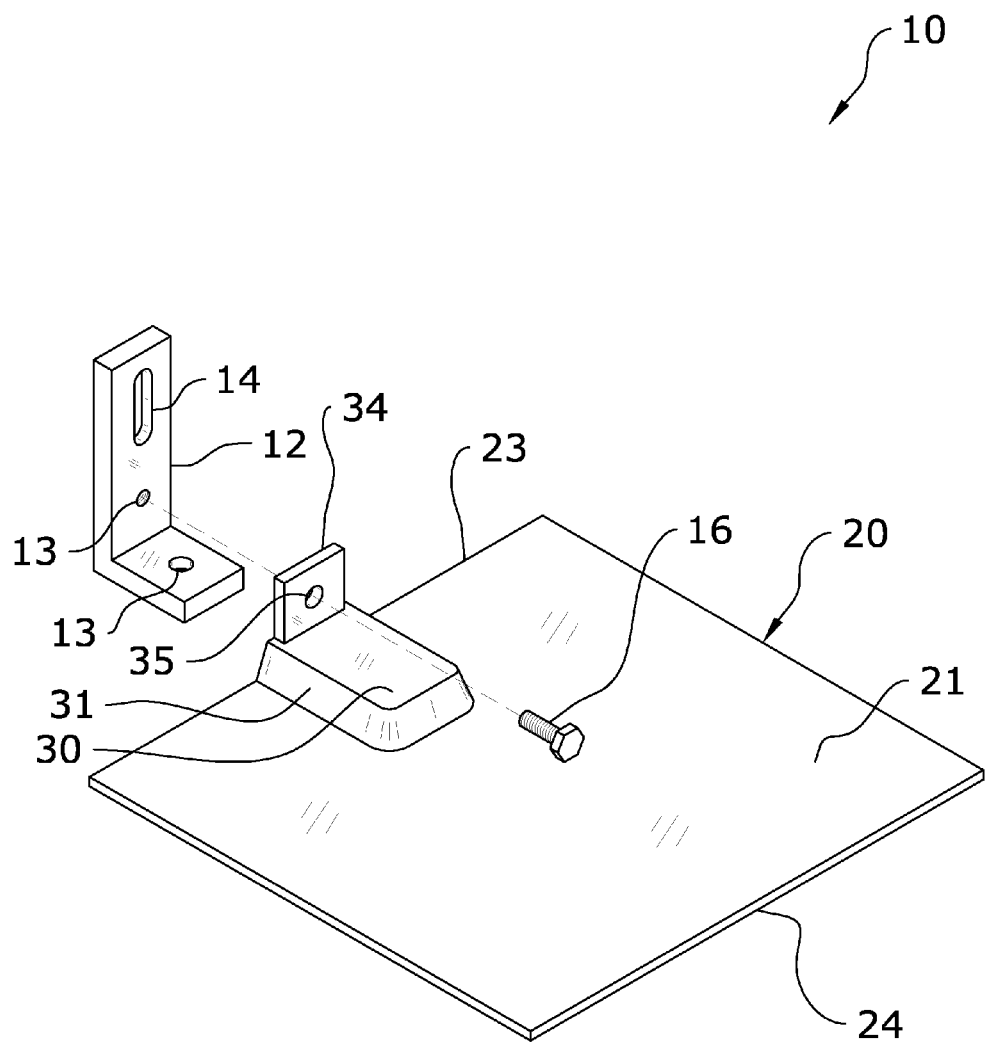
FIG. 3 is an upper perspective view of the present invention being aligned with an L-foot attachment.

The first end 23 of the flashing member 20 includes a receiver member 30 which is adapted to cover the horizontal portion of an L-foot 12 as shown in FIG. 3. The receiver member 30 is generally comprised of a raised portion 31 of the flashing member 20 which extends upwardly from its upper surface 21 at its first end 23 in a manner which defines a slot 32 which covers the horizontal portion of the L-foot attachment 12.

A mounting bracket 34 will also generally extend upwardly from the raised portion 31 of the receiver member 30 as shown in FIG. 1. The mounting bracket 34 is generally comprised of a vertical lip which extends upwardly from the distal end of the receiver member 30 and which includes an aperture 35 through which a fastener 16 may be extended to secure the flashing member 20 to the vertical portion of the L-foot attachment 12.

Preferably, the flashing member 20, receiver member 30 and mounting bracket 34 will be integrally formed of a unitary structure. By utilizing such a unitary construction of the present invention, it can be assured that the flashing member 20 will fully seal roof penetrations caused by installation of the L-foot attachment 12.

C. Operation of Preferred Embodiment.

In use, the horizontal portion of the L-foot attachment 12 is first secured to the roof 11 utilizing a fastener 16. The fastener 16 will require penetration of the roof 11 which necessitates the installation of the flashing member 20 of the present invention to prevent water leakage.

The vertical portion of the L-foot 12 will generally include a hole 13 which is utilized to secure the mounting bracket 34 of the receiver member 30 to the vertical portion of the L-foot 12, such as by use of a fastener 16 as shown in FIG. 3. The vertical portion of the L-foot 12 will also generally include either an additional hole 13 or a slot 14 which is utilized to secure the roof attachment 15 such as solar panels to the L-foot attachment 12.

Figure 4:
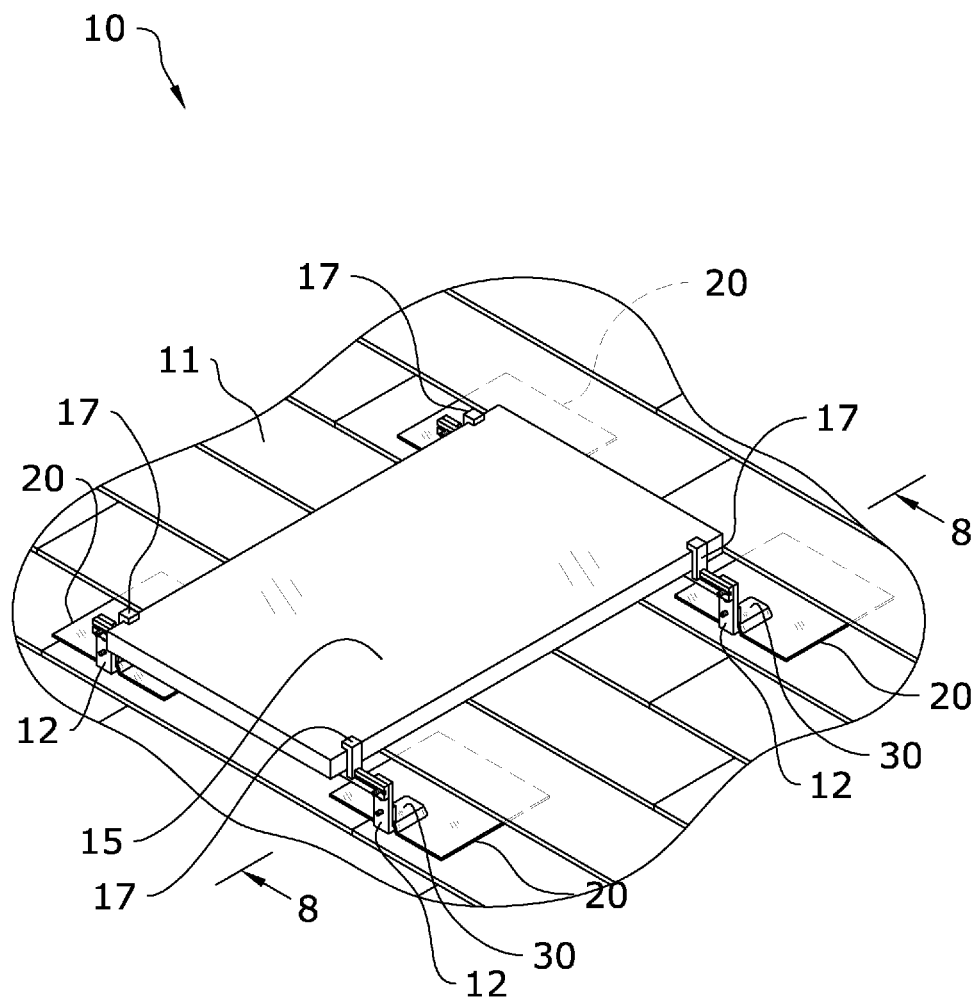
FIG. 4 is an upper perspective view of the present invention in use.
Figure 5:
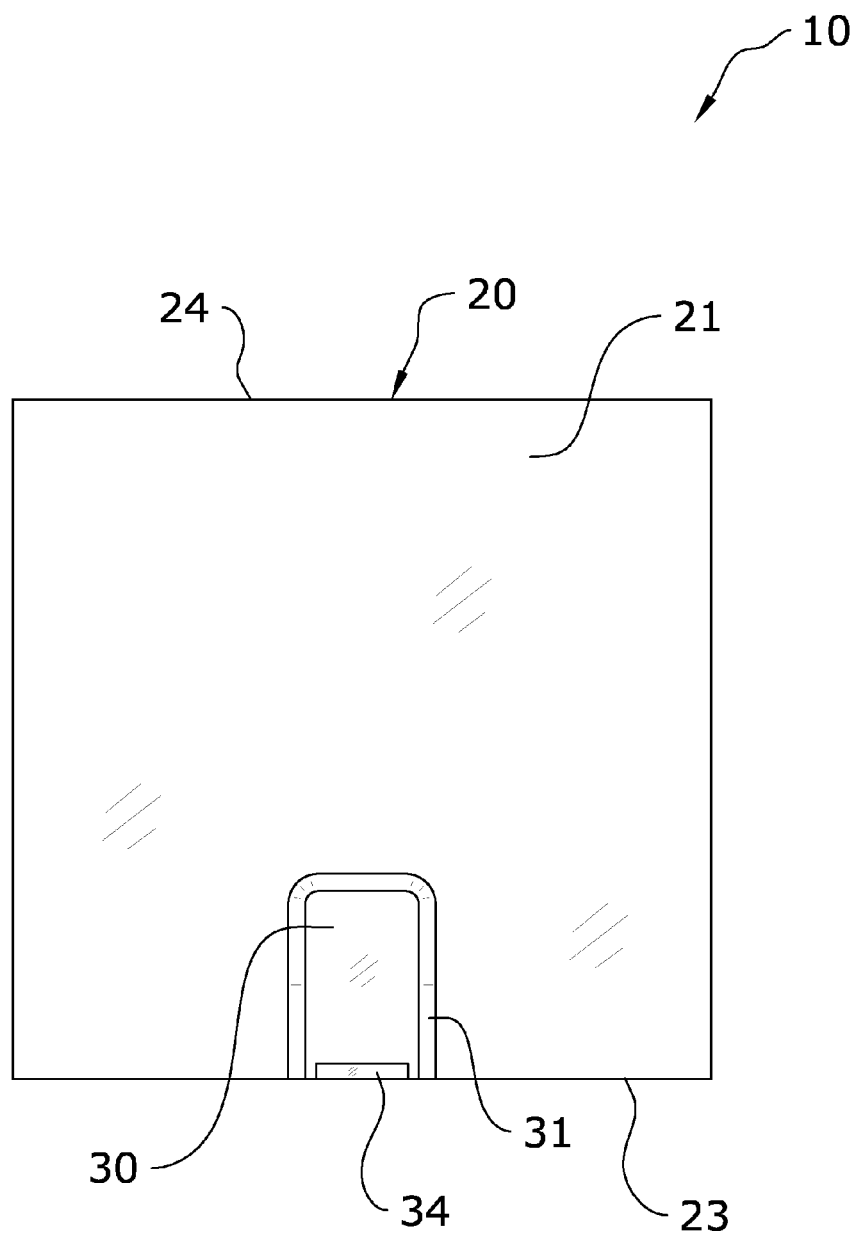
FIG. 5 is a top view of the present invention.
Figure 6:
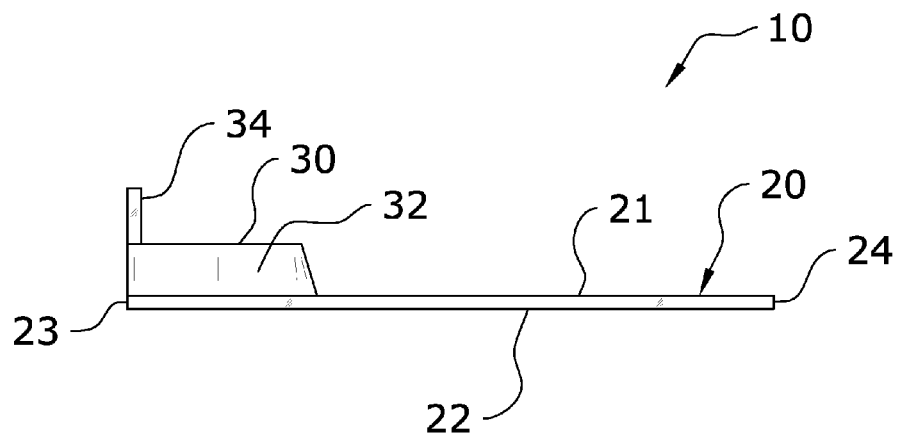
FIG. 6 is a side view of the present invention.
Figure 7:
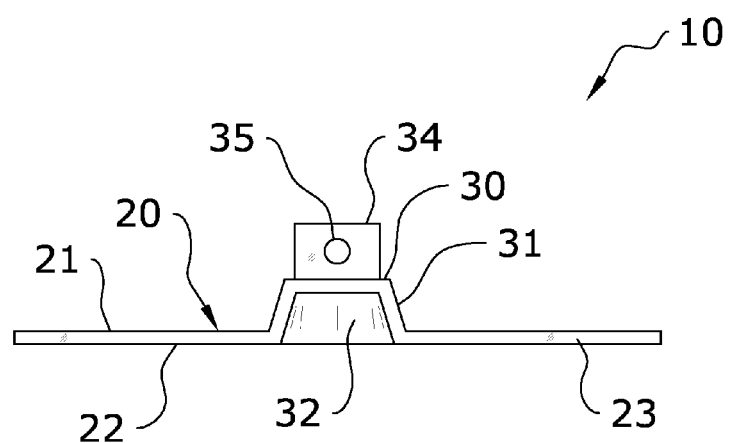
FIG. 7 is a front view of the present invention.
Figure 8:
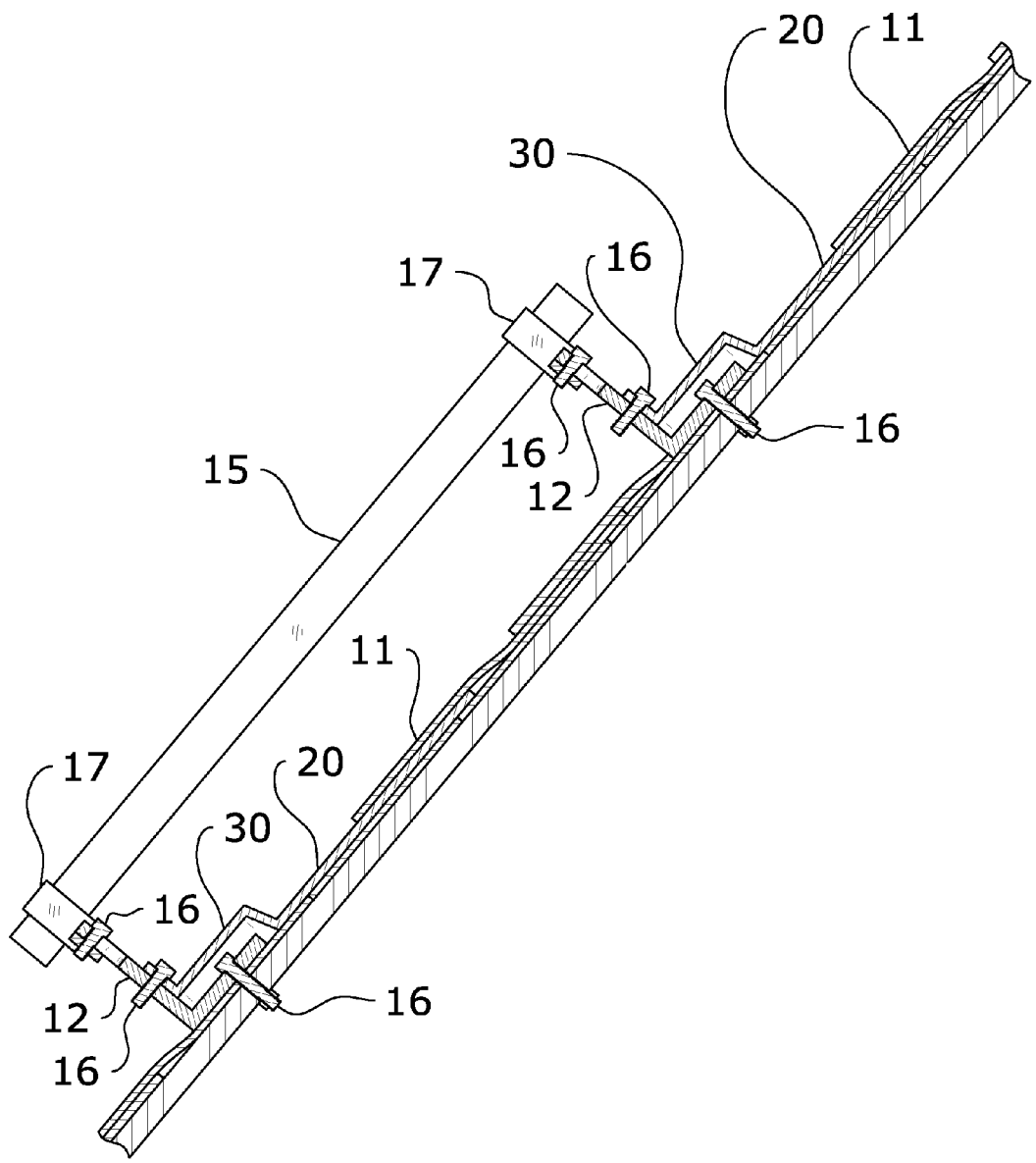
FIG. 8 is a sectional view of the present invention in use.

After securing the horizontal portion of the L-foot 12 to the roof 11, the flashing member 20 may be positioned over the horizontal portion of the L-foot 12 to waterproof the penetrations of the roof 11. The receiver member 30 is positioned over the horizontal portion of the L-foot attachment 12 in such a manner that the L-foot 12 is positioned within the slot 32 and thus fully covered and sealed from water penetration. Fasteners 16 may then be extended through both the hole 13 of the vertical portion of the L-foot 12 and the aperture 35 of the mounting bracket 34 of the receiver member 30 to secure the flashing member 20 to the L-foot 12. The roof attachment 15 may then be secured to the L-foot 12 as needed, such as through a roof attachment mounting assembly 17 such as shown in FIG. 4, with assurance that water will not penetrate the roof 11 due to the sealing nature of the flashing member 20.

Figure 9:
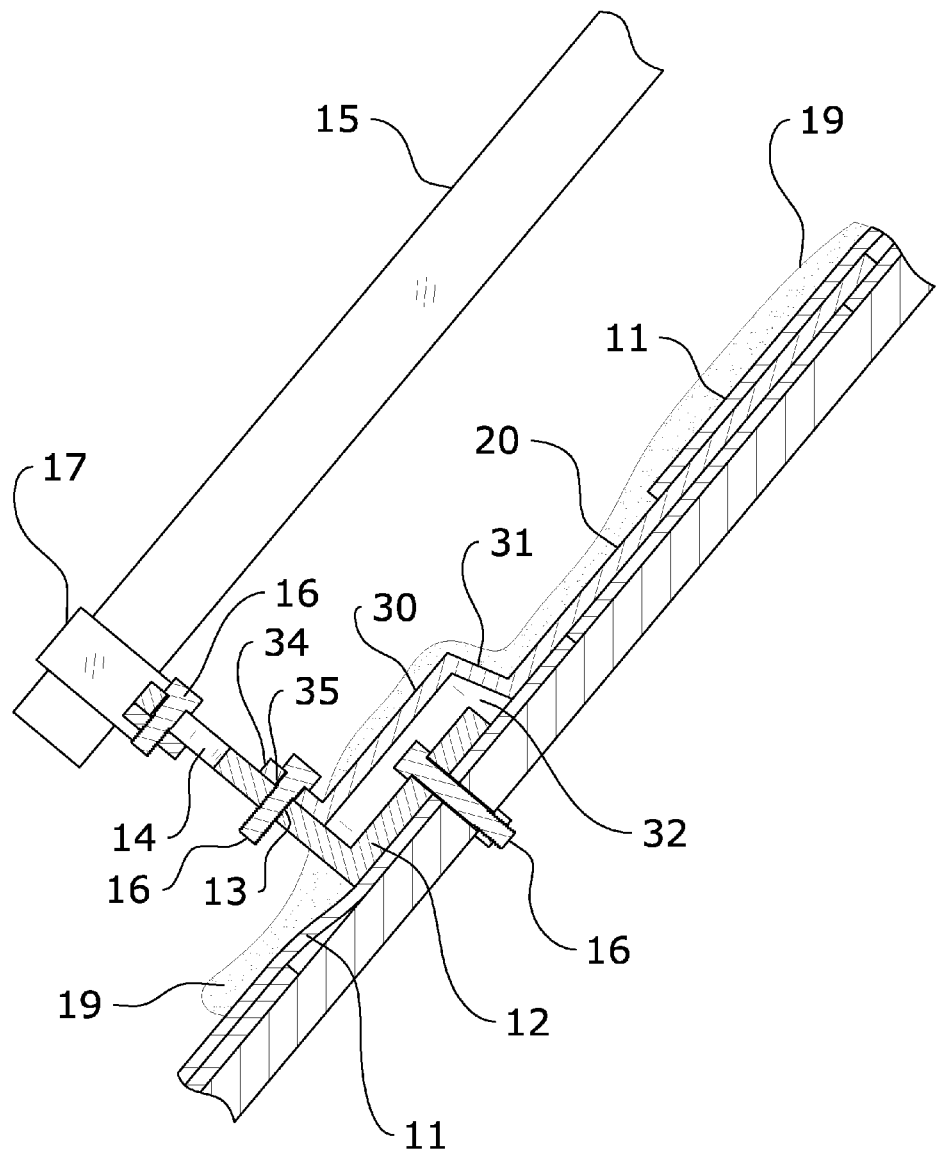
FIG. 9 is a sectional view of the present invention in use which illustrates water passing over the present invention.

Preferably, the end 23 of the flashing member 20 which includes the receiver member 30 will be positioned at the lower side of a sloped roof 11 so that water 19 may run over the receiver member 30 without penetrating the roof 11 as shown in FIG. 9. Accordingly, the other end 24 of the flashing member 20 will be positioned on the upper side of a sloped roof 11. This end 24 will preferably be positioned underneath the upper layer of the roof 11, while the first end 23 will be above the lower layer of the roof 11.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A roof attachment flashing system, comprising:
   an L-foot for securing an attachment to a roof, wherein said L-foot includes a vertical portion and a horizontal portion, wherein said horizontal portion is adapted to be secured to said roof;
   a flashing member for sealing penetrated portions of said roof;
   a receiver member extending upwardly from said flashing member adjacent a first end thereof to cover said horizontal portion of said L-foot; and
   a mounting bracket extending upwardly from said receiver member to secure said receiver member to said vertical portion of said L-foot.

2. The roof attachment flashing system of claim 1, wherein said flashing member is comprised of a square shape.

3. The roof attachment flashing system of claim 1, wherein said flashing member is comprised of aluminum.

4. The roof attachment flashing system of claim 1, wherein said mounting bracket includes an aperture.

5. The roof attachment flashing system of claim 1, wherein said receiver member is comprised of a raised portion of said flashing member.

6. The roof attachment flashing system of claim 5, further comprising a slot formed on a lower surface of said flashing member, said slot being defined by inner sidewalls of said raised portion of said receiver member.

7. The roof attachment flashing system of claim 1, wherein said flashing member and said receiving member are integrally formed of a unitary structure.

8. A roof attachment flashing system, comprising:
   an L-foot for securing an attachment to a roof, wherein said L-foot includes a vertical portion and a horizontal portion, wherein said horizontal portion is adapted to be secured to said roof;
   a flashing member for sealing penetrated portions of said roof;
   a receiver member extending upwardly from said flashing member adjacent a first end thereof to cover a horizontal portion of said L-foot;
   a vertical lip extending from said receiver member to secure said receiver member to said vertical portion of said L-foot,
   a first aperture on said vertical lip; and a second aperture on said vertical portion of said L-foot, wherein said first aperture is aligned with said second aperture.

9. The roof attachment flashing system of claim 8, wherein said receiver member is comprised of a raised portion of said flashing member.

10. The roof attachment flashing system of claim 9, further comprising a slot formed on a lower surface of said flashing member, said slot being defined by inner sidewalls of said raised portion of said receiver member.

11. The roof attachment flashing system of claim 8, wherein said flashing member, said vertical lip and said receiving member are integrally formed of a unitary structure.

12. The roof attachment flashing system of claim 8, wherein said flashing member is comprised of a rectangular shape.

13. The roof attachment flashing system of claim 8, wherein said flashing member is comprised of stainless steel.

14. A roof attachment flashing system, comprising:
   an L-foot for securing an attachment to a roof, wherein said L-foot includes a vertical portion and a horizontal portion, wherein said horizontal portion is adapted to be secured to said roof;
   a flashing member for sealing penetrated portions of said roof;
   a receiver member extending upwardly from said flashing member adjacent a first end thereof, said receiver member covering said horizontal portion of said L-foot; and
   a mounting bracket extending from said receiver member, wherein said mounting bracket is removably secured to said vertical portion of said L-foot;
   wherein said mounting bracket includes a first aperture, wherein said vertical portion includes a second aperture and further comprising a fastener adapted to extend through said first aperture and said second aperture to secure said mounting bracket to said L-foot.

15. The roof attachment flashing system of claim 14, wherein said flashing member, said mounting bracket and said receiving member are integrally formed of a unitary structure.

16. The roof attachment flashing system of claim 14, wherein said attachment is comprised of a solar panel.

17. The roof attachment flashing system of claim 14, wherein said flashing member is comprised of galvanized steel.

* * * * *